United States Patent
Seo

(10) Patent No.: US 9,648,623 B2
(45) Date of Patent: May 9, 2017

(54) METHOD AND DEVICE FOR PERFORMING DIRECT COMMUNICATION BETWEEN TERMINALS IN WIRELESS COMMUNICATION SYSTEM

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 14/405,988

(22) PCT Filed: Jun. 20, 2013

(86) PCT No.: PCT/KR2013/005449
§ 371 (c)(1),
(2) Date: Dec. 5, 2014

(87) PCT Pub. No.: WO2014/003358
PCT Pub. Date: Jan. 3, 2014

(65) Prior Publication Data
US 2015/0148030 A1 May 28, 2015

Related U.S. Application Data

(60) Provisional application No. 61/663,609, filed on Jun. 24, 2012, provisional application No. 61/674,805, filed on Jul. 23, 2012.

(51) Int. Cl.
*H04W 4/00* (2009.01)
*H04W 72/04* (2009.01)
(Continued)

(52) U.S. Cl.
CPC ........... *H04W 72/048* (2013.01); *H04L 5/001* (2013.01); *H04W 8/183* (2013.01); *H04W 72/04* (2013.01);
(Continued)

(58) Field of Classification Search
CPC .............. H04W 88/06; H04W 76/023; H04W 72/0453; H04W 72/04; H04W 72/048;
(Continued)

(56) References Cited

U.S. PATENT DOCUMENTS

2002/0147819 A1* 10/2002 Miyakoshi .............. H04L 29/06
709/228
2009/0106810 A1* 4/2009 Stoye .................... H04L 5/0064
725/131
(Continued)

FOREIGN PATENT DOCUMENTS

KR 10-2010-0112524 10/2010
KR 10-2011-0103852 9/2011
(Continued)

OTHER PUBLICATIONS

European Patent Office Application Serial No. 13808695.4, Search Report dated Jan. 26, 2016, 9 pages.
(Continued)

*Primary Examiner* — Ajit Patel
(74) *Attorney, Agent, or Firm* — Lee Hong Degerman Kang Waimey

(57) ABSTRACT

The present application discloses a method of performing, by a terminal, direct communication between terminals in a wireless communication system to which a carrier wave aggregating technique is applied. In particular, the method includes: reporting, to a base station, performance information on a terminal including information on a limited frequency band; and performing direct communication
(Continued)

between the terminal and an opposite terminal through a specific frequency band, wherein if the specific frequency band is the same as the limited frequency band, signal reception from the base station when performing direct communication between the terminals is limited.

12 Claims, 10 Drawing Sheets

(51) Int. Cl.
    *H04L 5/00*           (2006.01)
    *H04W 8/18*           (2009.01)
    *H04W 76/02*         (2009.01)
    *H04W 88/06*         (2009.01)

(52) U.S. Cl.
    CPC ..... *H04W 72/0453* (2013.01); *H04W 76/023* (2013.01); *H04L 5/0048* (2013.01); *H04L 5/0053* (2013.01); *H04L 5/0094* (2013.01); *H04W 88/06* (2013.01)

(58) Field of Classification Search
    CPC .... H04W 8/183; H04L 5/0053; H04L 5/0048; H04L 5/001; H04L 5/0094
    See application file for complete search history.

(56) References Cited

U.S. PATENT DOCUMENTS

| | | | |
|---|---|---|---|
| 2009/0135761 A1* | 5/2009 | Khandekar | H04L 5/0053 370/328 |
| 2009/0143095 A1* | 6/2009 | Zhang | H04B 1/005 455/552.1 |
| 2010/0136997 A1* | 6/2010 | Palanki | H04W 88/04 455/452.1 |
| 2011/0151887 A1 | 6/2011 | Hakola et al. | |
| 2011/0228666 A1 | 9/2011 | Barbieri et al. | |
| 2011/0300892 A1 | 12/2011 | Hakola et al. | |
| 2012/0106404 A1 | 5/2012 | Damnjanovic | |
| 2012/0147777 A1* | 6/2012 | Arashin | H04W 72/02 370/252 |
| 2013/0072189 A1* | 3/2013 | Cheng | H04W 36/0083 455/436 |
| 2013/0137475 A1* | 5/2013 | Rousu | H04W 72/0453 455/509 |
| 2013/0267237 A1* | 10/2013 | Kim | H04W 72/04 455/450 |
| 2014/0198655 A1* | 7/2014 | Ishii | H04W 76/023 370/235 |
| 2014/0342738 A1* | 11/2014 | Ishii | H04W 28/08 455/436 |

FOREIGN PATENT DOCUMENTS

| | | |
|---|---|---|
| KR | 10-2012-0060940 | 6/2012 |
| KR | 10-2012-0065918 | 6/2012 |
| WO | 2007/107895 | 9/2007 |
| WO | 2012/047928 | 4/2012 |
| WO | 2012/166969 | 12/2012 |

OTHER PUBLICATIONS

PCT International Application No. PCT/KR2013/005449, Written Opinion of the International Searching Authority dated Oct. 11, 2013, 16 pages.

\* cited by examiner (a) CONTROL-PLANE PROTOCOL STACK (b) USER-PLANE PROTOCOL STACK Implementation option 1 for half-duplex D2D Implementation option 2 for half-duplex D2D (a)

(b)

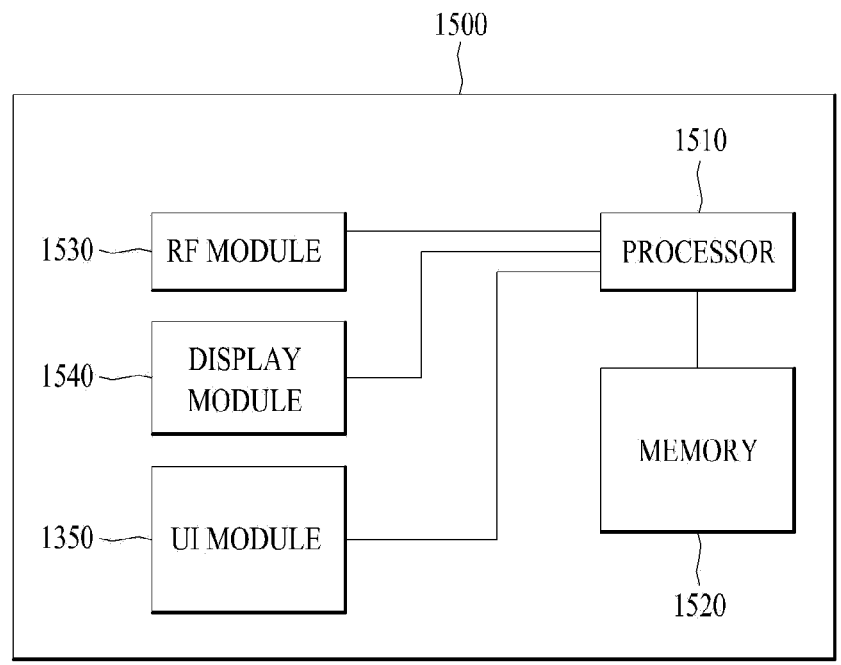

METHOD AND DEVICE FOR PERFORMING DIRECT COMMUNICATION BETWEEN TERMINALS IN WIRELESS COMMUNICATION SYSTEM

CROSS-REFERENCE TO RELATED APPLICATIONS

This application is the National Stage filing under 35 U.S.C. 371 of International Application No. PCT/KR2013/005449, filed on Jun. 20, 2013, which claims the benefit of U.S. Provisional Application Ser. No. 61/663,609, filed on Jun. 24, 2012 and 61/674,805, filed on Jul. 23, 2012, the contents of which are all hereby incorporated by reference herein in their entirety.

TECHNICAL FIELD

The present invention relates to a wireless communication system and, more particularly, to a method and apparatus for performing device-to-device (D2D) communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for performing device-to-device (D2D) communication in a wireless communication system.

Technical Solution

The object of the present invention can be achieved by providing a method for, at a user equipment (UE), performing device-to-device (D2D) communication in a wireless communication system to which a carrier aggregation scheme is applied including reporting UE capability information including information about a restricted frequency band to a base station and performing D2D communication with a counterpart UE via a specific frequency band, wherein, when the specific frequency band is equal to the restricted frequency band, signal reception from the base station is restricted upon D2D communication.

The UE capability information may include information about a plurality of frequency bands via which simultaneous signal reception from the base station is possible. Additionally, the UE capability information may include information about the specific frequency band, via which D2D communication is performed, and information about whether signal reception from the base station is restricted.

The restricted frequency band may be a downlink band paired with the specific frequency band.

The UE capability information may include configuration information of a plurality of reception circuits implemented in the UE, and the configuration information may include a list of frequency bands capable of being measured by the reception circuits.

The restricted frequency band may correspond to a secondary carrier among a plurality of carriers configured in the UE.

According to another aspect of the present invention, there is provided a user equipment (UE) apparatus for performing device-to-device (D2) communication in a wireless communication system to which a carrier aggregation scheme is applied including a wireless communication module configured to transmit and receive a signal to and from a base station or a counterpart UE apparatus of D2D communication and a processor configured to process the signal, wherein the processor controls the wireless communication module to report UE capability information including information about a restricted frequency band to a base station and to perform D2D communication with a counterpart UE via a specific frequency band, and wherein, when the specific frequency band is equal to the restricted frequency band, signal reception from the base station is restricted upon D2D communication.

Advantageous Effects

According to embodiments of the present invention, it is possible to efficiently perform device-to-device (D2D) communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 14 is a diagram showing an example of performing D2D communication according to an embodiment of the present invention if a UE having a maximum of two reception circuits is configured to receive a signal from an eNB via two carriers.

FIG. 15 is a block diagram of a communication apparatus according to an embodiment of the present invention.

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
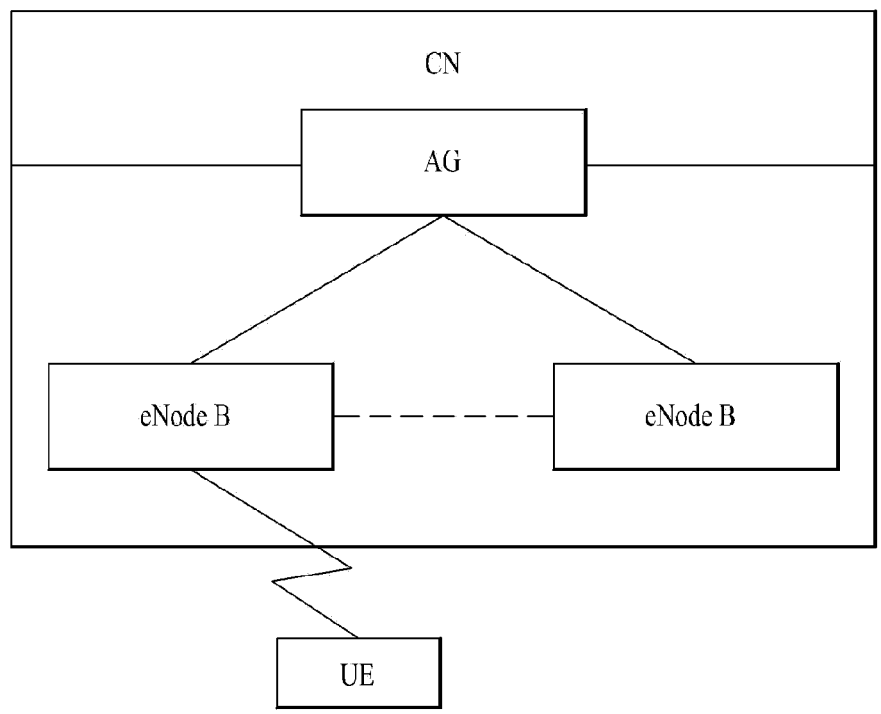
FIG. 1 is a diagram showing a network structure of an Evolved Universal Mobile Telecommunications System (E-UMTS) as an example of a wireless communication system.
Figure 2:
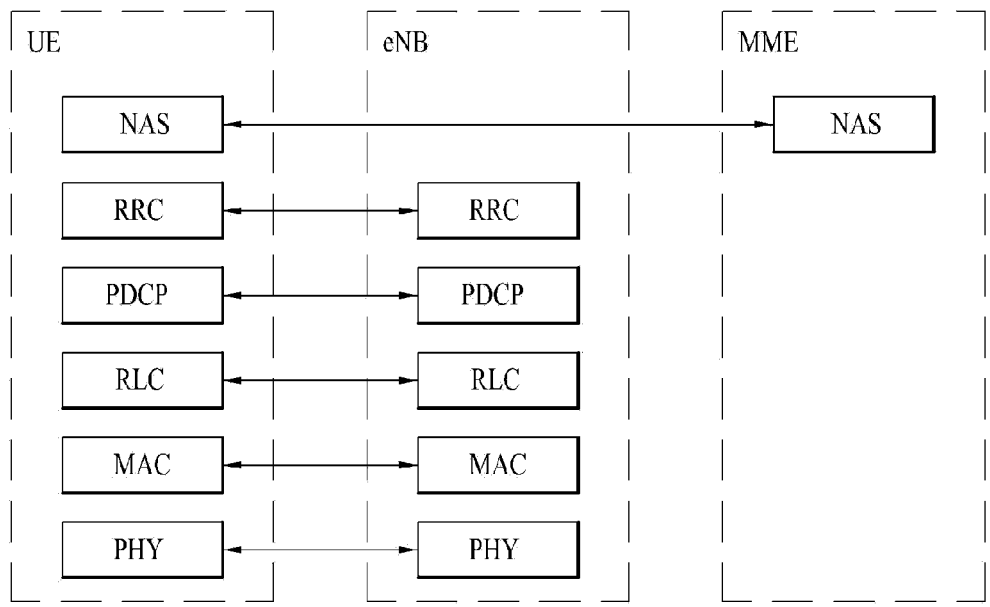
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
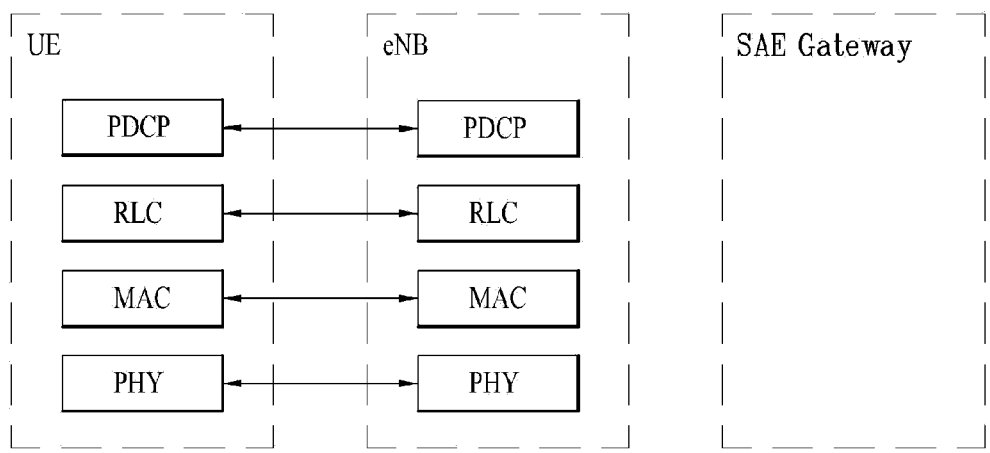

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
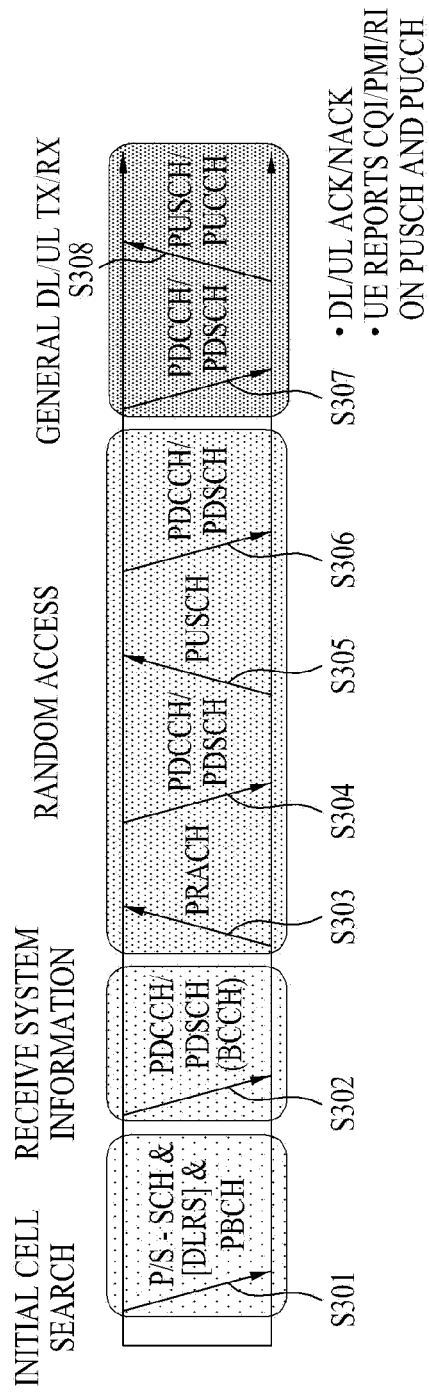
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
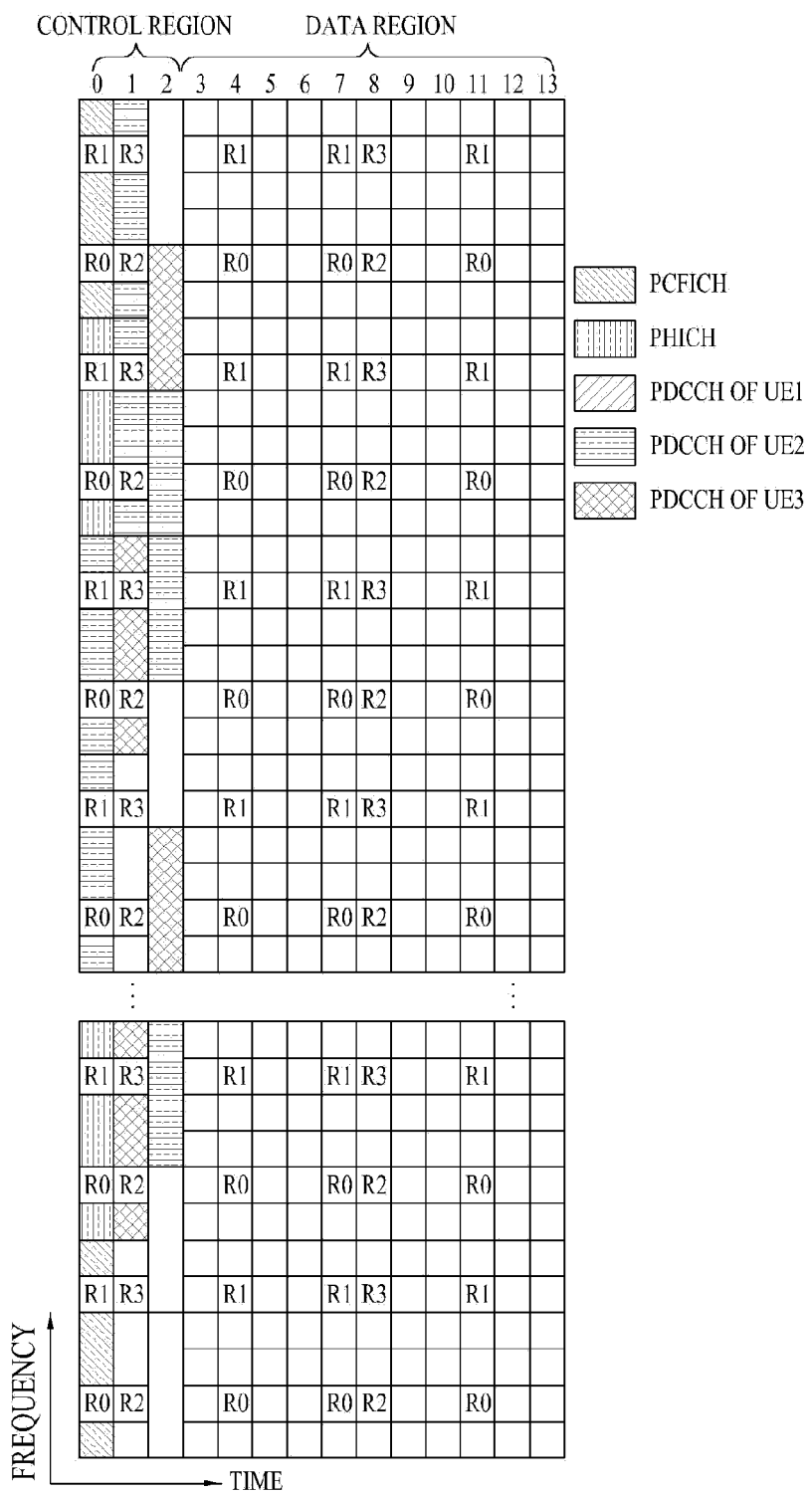
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
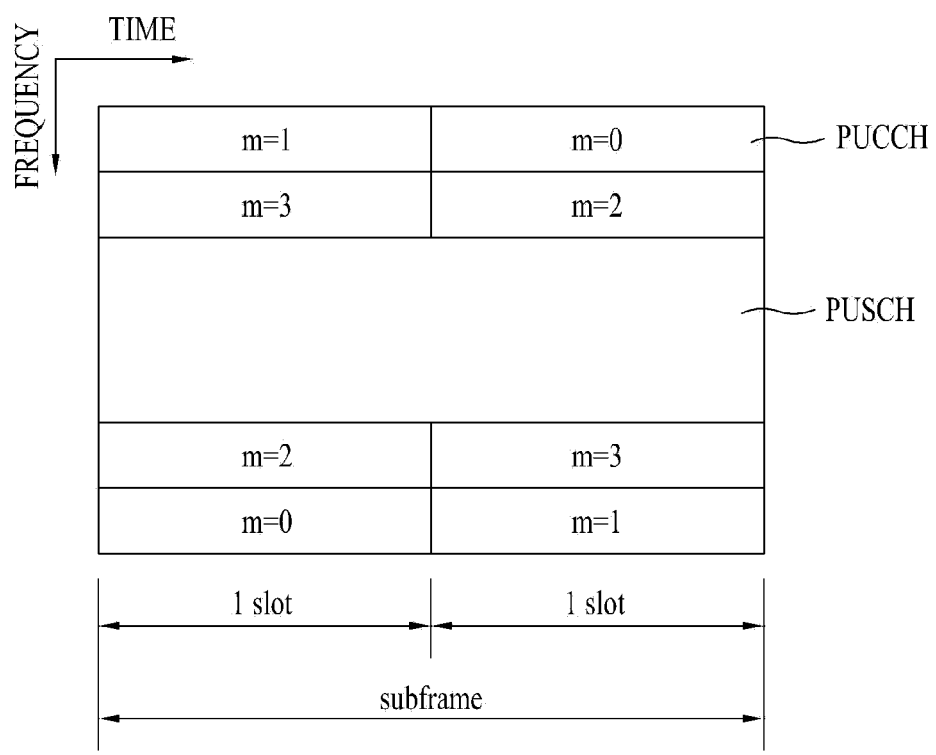
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
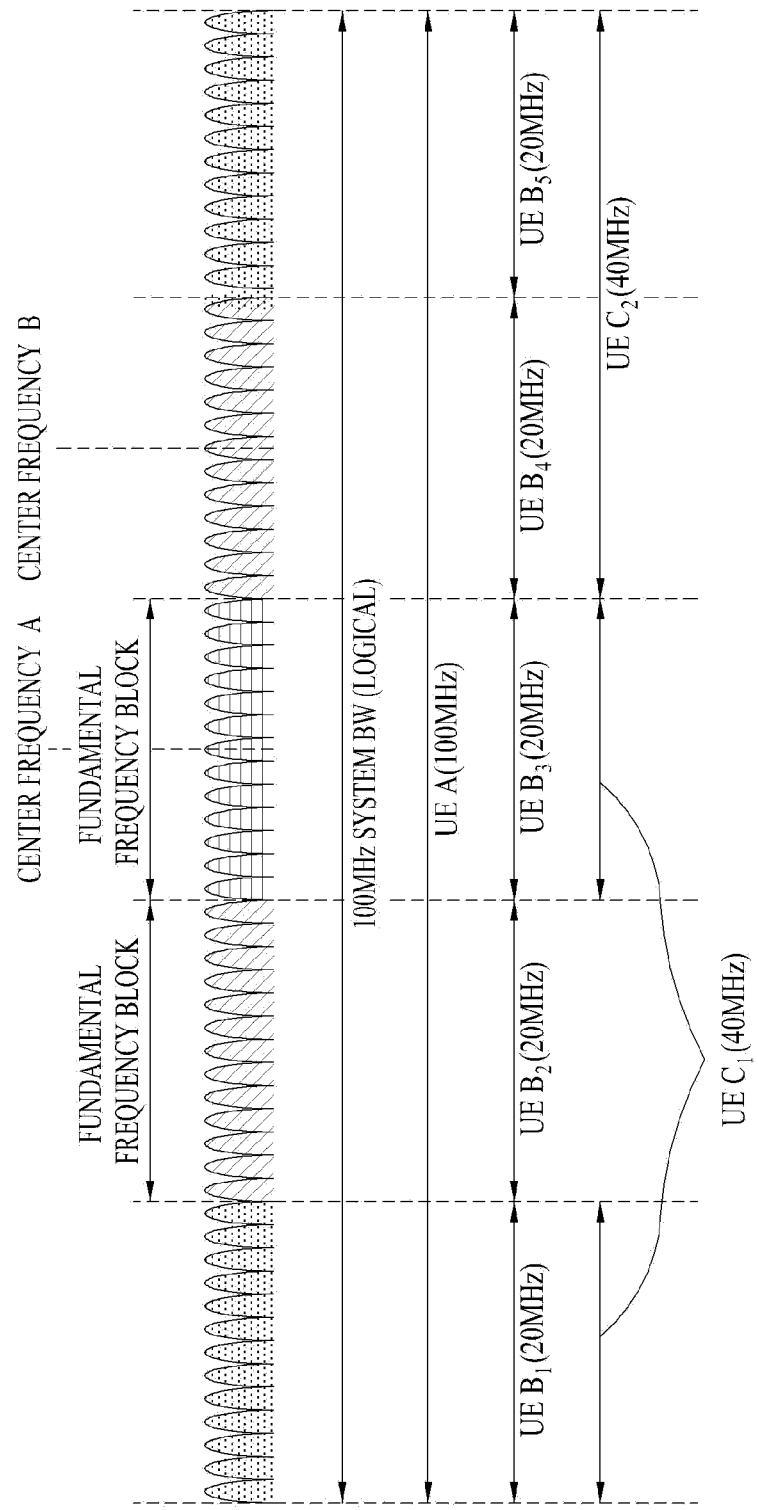
FIG. 6 is a diagram illustrating a carrier aggregation (CA) scheme.

FIG. 6 is a diagram illustrating a carrier aggregation (CA) scheme. Carrier aggregation refers to a method of, at a UE, utilizing a plurality of frequency blocks or cells (in a logical sense) composed of uplink resources (or component carriers) and/or downlink resources (or component carriers) as a large logical frequency bandwidth in order to use a wider frequency bandwidth in a wireless communication system. Hereinafter, for convenience of description, the term "component carrier" will be used.

Referring to FIG. 6, an entire system bandwidth (BW) is a logical bandwidth having a maximum bandwidth of 100 MHz. The entire system bandwidth includes five component carriers (CCs) and each CC has a maximum bandwidth of 20 MHz. The CC includes one or more physically contiguous subcarriers. Although CCs are shown as having the same bandwidth in FIG. 6, this is merely exemplary and CCs may have different bandwidths. Although CCs are shown as being adjacent to each other in the frequency domain, the CCs may be physically adjacent to or separated from each other.

Different center frequencies may be used for the CCs or one common center frequency may be used for physically adjacent CCs. For example, in FIG. 6, if it is assumed that all CCs are physically adjacent, a center frequency A may be used. If it is assumed that CCs are not physically adjacent, a center frequency A, a center frequency B and the like may be used for the respective CCs.

In the present specification, the CC may correspond to a system bandwidth of a legacy system. By defining the CC based on the legacy system, it is possible to provide backward compatibility and to facilitate system design in a radio communication environment in which an evolved UE and a legacy UE coexist. For example, if the LTE-A system supports carrier aggregation, each CC may correspond to the system bandwidth of the LTE system. In this case, the CC may have any one of bandwidth of 1.25, 2.5, 5, 10 or 20 MHz.

In the case in which the entire system bandwidth is extended by carrier aggregation, a frequency bandwidth used for communication with each UE is defined in CC units. A UE A may use 100 MHz which is the entire system bandwidth and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may or may not be logically or physically adjacent. The UE $C_1$ uses two non-adjacent CCs and the UE $C_2$ uses two adjacent CCs.

Figure 7:
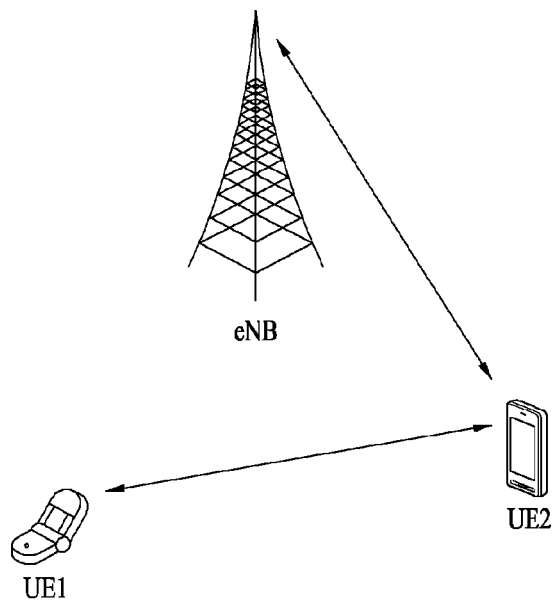
FIG. 7 is a diagram illustrating the concept of device-to-device (D2D) communication.

FIG. 7 is a diagram illustrating the concept of device-to-device (D2D) communication.

Referring to FIG. 7, in device-to-device (D2D) communication in which a UE directly performs wireless communication with another UE, that is, in direct communication between UEs, an eNB may transmit a scheduling message indicating D2D transmission and reception. A UE participating in D2D communication receives the D2D scheduling message from the eNB and performs transmission and reception operation indicated by the D2D scheduling message.

In the present invention, as shown in FIG. 7, a method for detecting a UE, which is a communication counterpart, when a UE directly performs D2D communication with another UE using a radio channel is proposed. The UE means a terminal of a user but a network entity such as an eNB may be regarded as a UE when the network entity transmits and receives a signal according to a communication method between UEs.

In the present invention, as shown in FIG. 7, a half-duplex D2D communication method for performing only one of two communication methods at a specific time when a UE performs D2D communication with another UE in a state of maintaining communication with an eNB is proposed.

In FIG. 7, UE #2 performs D2D communication with UE #1 to directly exchange data with UE #1 and, at the same time, maintains a communication link with the eNB to exchange necessary information with the eNB. That is, since even a UE for performing D2D communication should maintain the communication link with the eNB, at least two communication links are simultaneously maintained.

In general, D2D communication preferably uses uplink resources for transmitting a signal from a UE to an eNB, because a transmission circuit at uplink resources of the UE may be reused and interference with a neighboring UE may be avoided. More specifically, in an uplink communication link between the eNB and the UE, since a receiver is an eNB and is mounted in a region separated from the UE (e.g., on the roof of a building), interference of D2D communication using uplink resources with a communication link between the eNB and the UE is prevented. Uplink resources mean uplink band in an FDD system and time resources set to an uplink subframe in an TDD system. Similarly, downlink resources mean downlink band in an FDD system and time resources set to a downlink subframe.

While an existing UE has signal transmission capabilities in uplink resources and signal reception capabilities in downlink resources, a D2D UE further has signal reception capabilities in uplink resources. In addition, the D2D UE should receive a signal using downlink resources in order to receive a signal of an eNB. The UE can perform reception of signals using uplink resources and downlink resources and subsequent signal processing thereof and thus can maintain a communication link with the eNB while performing D2D communication.

If a reception circuit at downlink resources and a reception circuit at uplink resources are separately implemented (this is referred to as full-duplex D2D communication), simultaneous signal reception using both resources is possible at the same time. In contrast, if only one signal reception circuit of a UE is implemented and is used while switching between downlink resources and uplink resources (this is referred to as half-duplex D2D communication), reception of downlink resources and reception of uplink resources may not be simultaneously performed but UE implementation costs may be reduced. This is particularly useful if D2D communication is intermittently performed.

Figure 8:
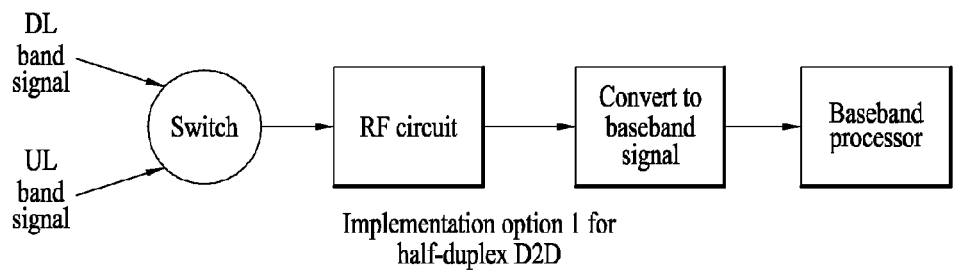
FIG. 8 is a diagram showing the structure of a receiver of a UE for performing half-duplex D2D communication.
Figure 8:
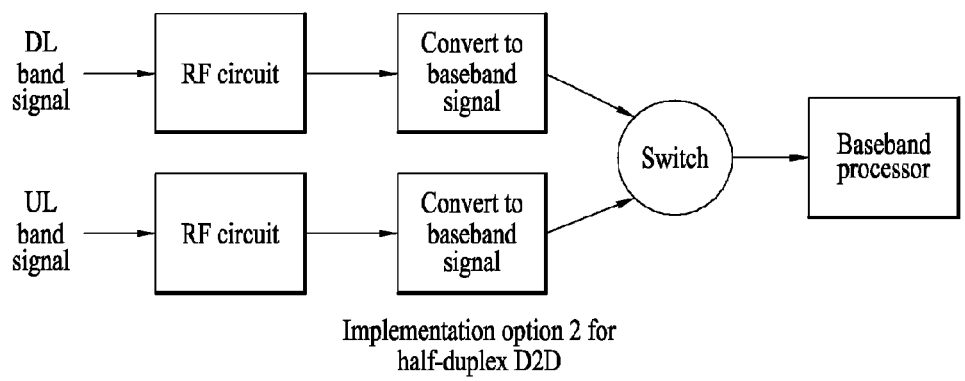

FIG. 8 is a diagram showing the structure of a receiver of a UE for performing half-duplex D2D communication.

First, in FIG. 8(a), only one reception (RF) circuit is implemented and a switch located at a previous stage of the reception circuit selects any one of a downlink band signal and an uplink band signal. In contrast, in FIG. 8(b), RF circuits for receiving a downlink band signal and an uplink band signal are included, only one baseband processing circuit is included, and switches located at previous stages of the RF circuits select one of the downlink band signal and the uplink band signal.

Figure 9:
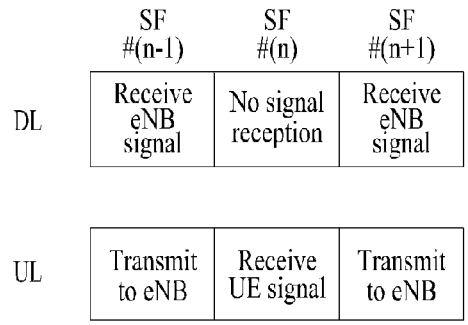
FIG. 9 is a diagram illustrating features of half-duplex D2D communication.

FIG. 9 is a diagram illustrating features of half-duplex D2D communication.

In FIG. 9, a UE may perform D2D communication for receiving a signal of another UE via uplink resources on subframe #n but may not perform reception from an eNB via downlink resources in half-duplex D2D communication operation. Accordingly, operation for preventing a control signal (e.g., a PDCCH or a PHICH) or a data signal (e.g., a PDSCH) of the eNB from being received on subframe #n needs to be defined.

A UE capable of performing the CA scheme for receiving a signal by aggregating a plurality of carriers generally has separate reception circuits respectively corresponding to the carriers, particularly, when the carriers operate at different frequency bands.

Figure 10:
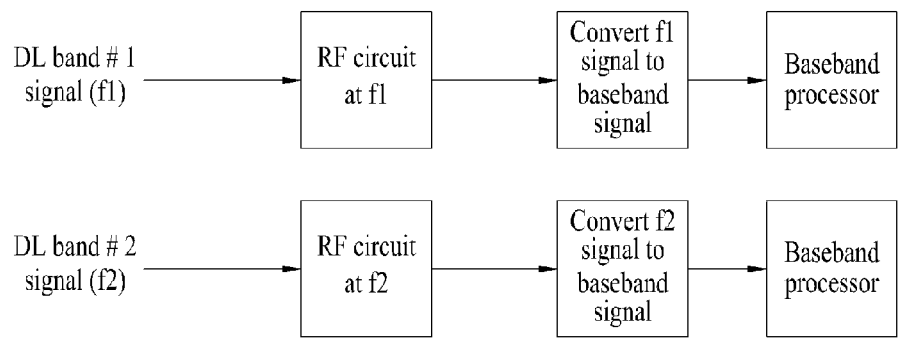
FIG. 10 is a diagram showing the structure of a UE for receiving a signal from an eNB using a CA scheme.

FIG. 10 is a diagram showing the structure of a UE for receiving a signal from an eNB using a CA scheme. Reception circuits (RF circuits) are provided at frequency bands f1 and f1.

If the UE having the structure of FIG. 10, that is, the receiver, is configured to receive a downlink signal via one carrier (that is, if the CA scheme is not configured), the second reception circuit may be used to receive the signal in D2D communication, thereby preventing reception restriction of the eNB signal shown in FIG. 9.

Figure 11:
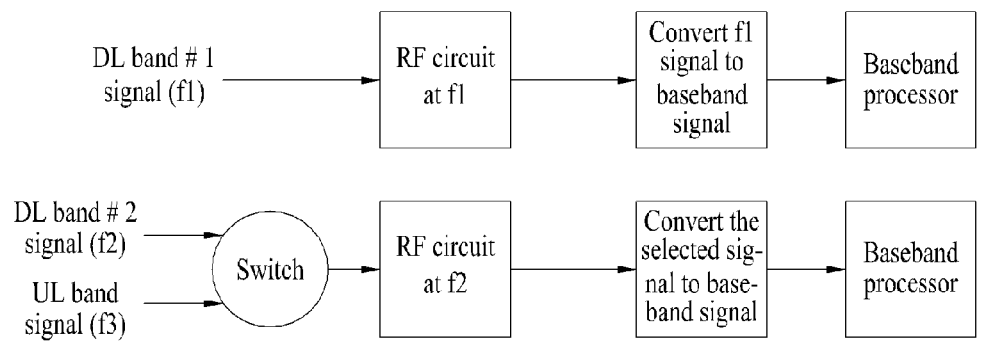
FIG. 11 is a diagram showing the structure of a receiver for performing D2D communication according to an embodiment of the present invention.
Figure 12:
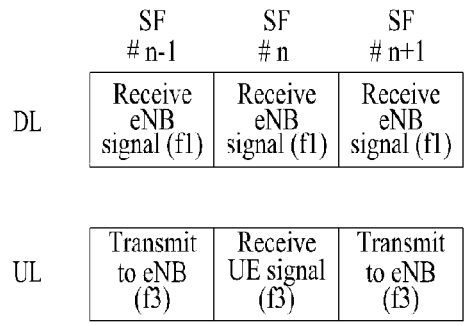
FIG. 12 is a diagram showing an example of performing D2D communication according to an embodiment of the present invention.

FIG. 11 is a diagram showing the structure of a receiver for performing D2D communication according to an embodiment of the present invention. FIG. 12 is a diagram showing an example of performing D2D communication according to an embodiment of the present invention.

First, referring to FIG. 11, a frequency band of a signal to be received is selected using a switch located at a previous stage of a second reception circuit. In particular, if an eNB signal is received via two carriers, a first circuit receives the signal of downlink band #1 transmitted at f1 and the second circuit receives the signal of downlink band #2 transmitted at f2.

In contrast, if the eNB signal is received via one carrier, the first circuit receives the signal of downlink band #1 transmitted at f1 and the second circuit receives the D2D signal of an uplink band transmitted at f3.

As a result, as shown in FIG. 12, although the D2D signal is received on subframe #n, the eNB signal may be received via downlink resources.

If the UE may receive the eNB signal via a total of N carriers and is configured to receive the eNB signal via M (<N) carriers, the UE receives the D2D signal transmitted at uplink bands using N-M reception circuits which are not used to receive the eNB signal. Here, N may indicate the number of reception circuits.

Of course, according to implementation, since the D2D signal may not be received via all N carriers, if the number of reception circuits used to receive the eNB signal among the N reception circuits of the UE is N1 and the number of reception circuits used to receive D2D signal is N2, N1+N2=N. In the example of FIG. 11, N1=1, N2=1 and N=2. Since this is shared between the eNB and the UE in advance, the UE may exchange information about how many reception circuits are included or about how many reception circuits may be used to receive both the eNB signal and the D2D signal.

If the number of carriers which may be used to receive the eNB signal is less than the maximum number of reception circuits, as shown in FIG. 12, assume that there is no restriction on reception of the eNB signal. In contrast, if the number of carriers which may be used to receive the eNB signal is equal to the maximum number of reception circuits, as shown in FIG. 9, assume that reception of the eNB signal is restricted when the D2D signal is received.

Of course, since a UE including a dedicated reception circuit for receiving a D2D signal in addition to N reception circuits may perform communication without a restriction on reception of the signal from an eNB, information about the number of dedicated reception circuits for receiving the D2D signal may also be exchanged in advance.

As described above, as a method for, at a UE, reporting, to an eNB, information about reception circuits which may be used to receive a signal in D2D communication, the UE may report on which carrier a reception restriction is imposed when receiving a D2D signal via a specific carrier. Specifically, in a state in which the CA scheme is performed, the UE may inform the eNB of a frequency band of a reception circuit changed to be used for D2D communication when a D2D signal is received at a specific frequency band and at which frequency band reception of the signal from the eNB is restricted.

More specifically, if the UE receives the D2D signal via band #3 when band #1 and band 2 are aggregated, the eNB may be informed as to whether a reception restriction is imposed on band #1, band #2 or band #1 and band #2. Here, band #3 used to receive the D2D signal may mean only a band defined as an uplink band in FDD or mean a band at which DL transmission and UL transmission are respectively performed according to time in TDD. As such a signaling example, {(an aggregate of bands aggregated by the UE), a band at which a D2D signal is received, whether a reception restriction is necessary, (an aggregate of bands requiring a reception restriction)} may be defined.

For example, when band #1 and band #2 are aggregated, if a UE which receives a D2D signal at band #3 requires a reception restriction at band #1, such signaling may be defined in the form of {(band #1, band 2), band #3, necessary, (band #1)}. Here, band #3 may be equal to or different from another band.

Of course, if a specific UE does not require a reception restriction when receiving a D2D signal at a specific band, the specific UE may inform the eNB that a reception restriction is not required. For example, when band #1 and band #2 are aggregated, if a UE for receiving a D2D signal at band #3 does not require a reception restriction at either band, such signaling may be defined in the form of {(band #1, band #2), band #3, unnecessary}. In particular, in this case, since a reception restriction is unnecessary, information about a combination of bands requiring a reception restriction may be excluded from the signaling.

Additionally, necessity of a reception restriction may be reported using various forms according to bands on which a reception restriction is imposed. For example, if the UE performs D2D communication via band #3 when band #1 and band #2 are aggregated, the eNB may be informed that D2D communication is possible at band #3 when a reception restriction is imposed on band #1 and the eNB may be informed that D2D communication is possible at band #3 when a reception restriction is imposed on band #3. This means that two receivers for receiving band #1 and band #2 may perform D2D communication by switching to band #3.

Signaling of such information may be indicated in the form of {(band #1, band #2), band #3, necessary, (band #1)} and {band #1, band #2}, band #3, necessary, (band #2)}. The eNB, which has received such information, impose a reception restriction on one of band #1 and band #2 to perform D2D communication at band #3. Refer to FIG. 13(a).

In contrast, according to UE implementation, if the reception circuit of band #2 may not be switched to band #3, since only a reception restriction on band #1 for D2D communication is valid, only {(band #1, band #2), band #3, necessary, (band #1)} is reported as signaling. Refer to FIG. 13(b).

In an FDD system, an uplink band used for D2D communication and a downlink band on which a reception restriction is imposed may be restricted to a pairing band for duplex. That is, if the UE receives a D2D signal via a specific carrier defined as an uplink band, a reception restriction is always imposed on a carrier defined as a downlink band paired with the uplink band.

If such a restriction is imposed, the eNB and the UE may share information indicating on which band a reception restriction is imposed when a D2D signal is received, without separate signaling. In this case, a process of reconfiguring a primary carrier may be performed. That is, when D2D communication is performed via an uplink primary carrier, reception of a signal from the eNB is restricted at a downlink primary carrier. For example, when reception of the signal from the eNB is restricted at the downlink primary carrier due to D2D communication via the uplink primary carrier, a secondary carrier on which reception restriction is not imposed may be instantaneously changed to a primary carrier.

As another signaling example, a UE may inform a network of configuration information of a circuit used to receive a D2D signal (or a radio frequency (RF) circuit implemented in the UE). The configuration information of the signal reception circuit of D2D communication includes information about which band and/or which combination of bands may be measured by each reception circuit of the UE.

Figure 13:
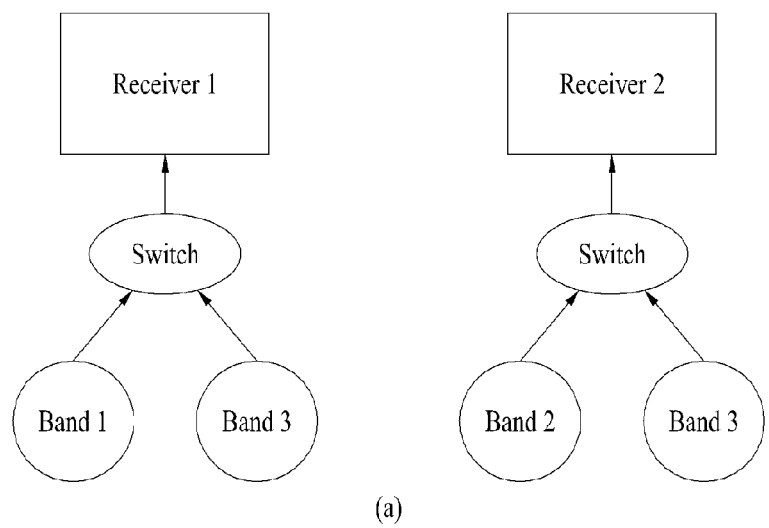
FIG. 13 is a diagram showing the configuration of a UE for D2D communication according to an embodiment of the present invention.
Figure 13:
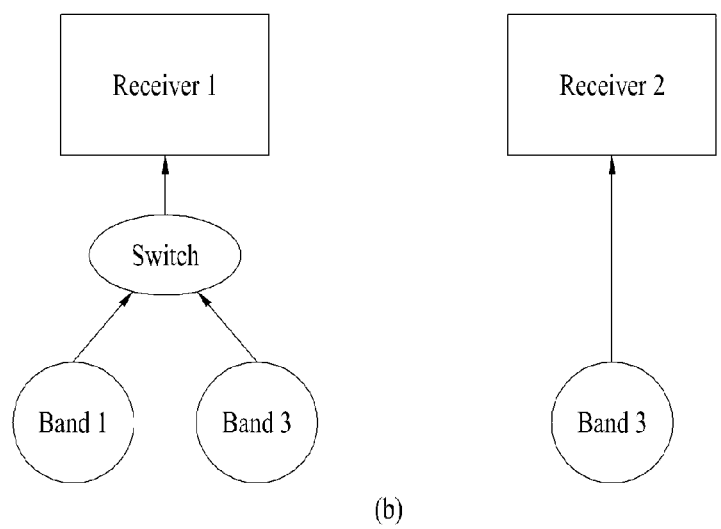

FIG. 13 is a diagram showing the configuration of a UE for D2D communication according to an embodiment of the present invention.

Referring to FIG. 13, as configuration information of reception circuit #1, measurement information may be defined and reported as {band 1, band 3} in FIGS. 13(a) and 13(b). Here, a list of bands indicates bands which may be measured at reception circuit #1.

In contrast, as configuration of reception circuit #2, measurement information may be defined and reported as {band 2, band 3} in FIG. 13(a) but measurement information may be defined and reported as {band 2} in FIG. 13(b). Similarly, a list of bands indicates bands which may be measured at reception circuit #2.

Preferably, the UE may use a general procedure of reporting capability information of the UE in order to inform the network of the above-described information.

Hereinafter, detailed operation for imposing reception restriction on a signal from an eNB when a D2D signal is received if all reception circuits of a UE are configured to be used to receive the signal from the eNB will be described.

FIG. 14 is a diagram showing an example of performing D2D communication according to an embodiment of the present invention if a UE having a maximum of two reception circuits is configured to receive a signal from an eNB via two carriers.

Referring to FIG. 14, if a UE receives a D2D signal on subframe #n, since one of the two reception circuits should be used to receive a D2D signal, one of the two carriers used to receive the eNB signal may not be received. In this case, one reception circuit or one carrier on which reception restriction is imposed should be selected.

However, a primary carrier or a primary cell should be used to send important information such as system information and to continuously perform measurement such as radio link monitoring. Accordingly, the present invention proposes reception of a D2D signal using a circuit for receiving a secondary carrier or a secondary cell if necessary while continuously receiving a signal from an eNB via a primary carrier. Such operation is particularly useful when a carrier on which reception restriction is imposed is selected from among two or more carriers when D2D communication is performed as in the configuration of the UE shown in FIG. 13(a).

In FIG. 14, reception of the eNB signal at downlink band #2 corresponding to the secondary carrier is restricted in order to receive the D2D signal on subframe #n. Although reception of the eNB is restricted only on subframe #n for performing D2D communication in the example of FIG. 14, an additional restriction may be imposed on subframes adjacent to subframe #n according to the location of the symbol occupied by the D2D signal, the magnitude of a timing advance (TA) value applied to an uplink subframe, the length of time necessary for switching between f2 and f3, etc.

In a state in which a plurality of subcarriers is configured, one of the subcarriers may be selected according to predetermined priority to restrict signal reception from the eNB. For example, a secondary carrier having a largest or smallest carrier index may be selected for reception restriction.

In particular, operation for setting a carrier, on which a restriction is imposed, according to a predetermined rule at a UE is suitable when an eNB does not explicitly send a command for selecting a specific carrier and using a reception circuit used at the selected carrier for D2D communication, for example, when the UE receives a D2D signal via predetermined resources without dedicated signaling of the eNB, and more particularly, when a discovery signal for detecting adjacent UEs is received.

In FIG. 14, in restriction of signal reception from the eNB, a specific carrier may be regarded as being instantaneously deactivated. That is, the eNB and the UE recognize that a specific carrier is instantaneously deactivated during a predetermined period on a subframe on which a D2D signal is received and subframes adjacent thereto. In particular, since the location of the subframe on which the D2D signal is received is specified between the eNB and the UE in advance, the UE and the eNB may accurately check when or how frequently such instantaneous deactivation occurs. The eNB and the UE may operate on the assumption that the carrier is automatically activated again when an instantaneous deactivation period has elapsed.

As described above, if the specific carrier is instantaneously deactivated, operation related to the CA scheme may be partially changed. For example, if a unique secondary carrier is deactivated in a cross-carrier scheduling state, cross-carrier scheduling becomes unnecessary and a field associated therewith may be deleted from downlink control information. As another example, if some secondary carriers are deactivated, the maximum number of ACK/NACK transmitted on one uplink subframe is reduced, and thus channel coding for ACK/NACK or a method for mapping an ACK/NACK signal to a PUCCH may be appropriately changed. As another example, if the carrier is instantaneously deactivated during self-scheduling at some secondary carriers, uplink grant transmitted on the carrier may be no longer transmitted and received. In this case, a scheduling carrier may be changed to a deactivated carrier to continuously transmit and receive uplink grant.

If the specific UE performs D2D communication at a specific band and the eNB checks to which carrier the reception circuit to be used is assigned based on information about the reception circuit used to receive a signal in D2D communication of the UE, the eNB may specify the carrier of the reception circuit to be used by the UE for performing D2D communication via a higher layer signal such as RRC or an L1/L2 control signal.

Due to such operation, when a specific UE performs D2D communication, a gap is generated in a signal from an eNB with respect to the carrier specified by the eNB or the specific carrier is instantaneously deactivated. For example, when the eNB indicates to the UE that D2D reception is performed on a specific subframe, an indicator for the carrier may be added such that a gap is generated in the signal from the eNB with respect to the carrier or the carrier is deactivated while D2D reception is performed via the specific carrier or during a predetermined period including the peripheral times thereof.

Although a relationship between signal reception of D2D communication and signal reception from the eNB has been described, a similar restriction may be imposed on signal reception of D2D communication and signal transmission to the eNB.

For example, when a UE receives a D2D signal via frequency band #1 and transmits a signal to an eNB via frequency band #2, signal reception of D2D communication at frequency band #1 may be impossible due to strong interference from the signal transmitted to the eNB via frequency band #2.

Accordingly, for signal reception of D2D communication at frequency band #1, signal transmission to the eNB at frequency band #2 is restricted and, more particularly, such a restriction is likely to be imposed if two frequency bands are close. Such a restriction includes stop of transmission to the eNB or maintenance of power of the signal transmitted to the eNB at a predetermined level or less.

Accordingly, as a method similar to the above-described embodiments, a UE may report a transmission/reception circuit configuration state to an eNB in advance and, more particularly, may inform the eNB of information indicating at which frequency band a D2D signal is received and at which frequency band signal transmission to the eNB is restricted. As a detailed example, when the UE transmits an uplink signal to the eNB by aggregating band #1 and band #2, if a D2D signal is received via band #3 and transmission via band #1 needs to be restricted, the eNB may be informed of information such as {(band #1, band #2), band #3, necessary, (band #1)}. Such information may use a general procedure of reporting capability information of the UE.

Additionally, although the band refers to a frequency band defined in the 3GPP standard in the above-described embodiments, the band may refer to a frequency resource such as a component carrier (or cell) in a CA scheme.

FIG. 15 is a block diagram for an example of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of informations. And, the display module 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example in which a method and apparatus for performing D2D communication in a wireless communication system is applied to a 3GPP LTE system has been described, the present invention is applicable to various wireless communication systems in addition to the 3GPP LTE system.

The invention claimed is:

1. A method for, by a user equipment (UE), performing device-to-device (D2D) communication in a wireless communication system to which a carrier aggregation scheme is applied, the method comprising:
   configuring at least one first frequency band for a communication with a base station and a second frequency band for D2D communication with a counterpart UE; and
   receiving only one signal of a first signal from the base station or a second signal from the counterpart UE transmitted at a same time, when the UE is not capable of simultaneous reception on the at least one first frequency band and the second frequency band,
   wherein the at least one first frequency band and the second frequency band are configured by prioritizing the at least one first frequency band firstly, and the second frequency band secondly.

2. The method according to claim 1, further comprising:
   transmitting UE capability information on the simultaneous reception on the at least one first frequency band and the second frequency band, to the base station.

3. The method according to claim 2, wherein the UE capability information includes information about the simultaneous reception via the second frequency band being restricted or not.

4. The method according to claim 2, wherein the UE capability information includes information about the at least one frequency band.

5. The method according to claim 1, wherein when a number of a capability of simultaneous reception of the UE is N and a number of the at least one first frequency band is M, a number of the second frequency band is N-M, where N and M are integers.

6. The method according to claim 1, wherein the second frequency band corresponds to a secondary carrier among a plurality of carriers configured in the UE.

7. A user equipment (UE) apparatus for performing device-to-device (D2D) communication in a wireless communication system to which a carrier aggregation scheme is applied, the UE apparatus comprising:
   a wireless communication module configured to transmit and receive a signal to and from a base station or a counterpart UE apparatus of D2D communication; and
   a processor configured to process the signal,
   wherein the processor is configured to:
      configure at least one first frequency band for a communication with a base station and a second frequency band for D2D communication with a counterpart UE, and
      control the wireless communication module to receive only one signal of a first signal from the base station or a second signal from the counterpart UE transmitted at a same time, when the UE is not capable of simultaneous reception on the at least one first frequency band and the second frequency band,
      wherein the at least one first frequency band and the second frequency band are configured by prioritizing the at least one first frequency band firstly, and the second frequency band secondly.

8. The UE apparatus according to claim 7, wherein the processor is further configured to control the wireless communication module to transmit UE capability information on the simultaneous reception on the at least one first frequency band and the second frequency band, to the base station.

9. The UE apparatus according to claim 8, wherein the UE capability information includes information about the simultaneous reception via the second frequency band being restricted or not.

10. The UE apparatus according to claim 8, wherein the UE capability information includes information about the at least one frequency band.

11. The UE apparatus according to claim 7, wherein when a number of a capability of simultaneous reception of the UE is N and a number of the at least one first frequency band is M, a number of the second frequency band is N-M, where N and M are integers.

12. The UE apparatus according to claim 7, wherein the second frequency band corresponds to a secondary carrier among a plurality of carriers configured in the UE.

* * * * *